United States Patent [19]

Willard

[11] Patent Number: 4,876,101

[45] Date of Patent: * Oct. 24, 1989

[54] SNACK FOOD INGREDIENT AND METHOD FOR MAKING SAME

[76] Inventor: Miles J. Willard, 229 North Loyd Cir., Idaho Falls, Id. 83402

[*] Notice: The portion of the term of this patent subsequent to May 24, 2005 has been disclaimed.

[21] Appl. No.: 210,878

[22] Filed: Jun. 24, 1988

Related U.S. Application Data

[63] Continuation of Ser. No. 883,519, Jul. 8, 1982, Pat. No. 4,756,920.

[51] Int. Cl.$^4$ ............................................. A21D 10/00
[52] U.S. Cl. .................................... 426/549; 426/560; 426/653
[58] Field of Search ............... 426/549, 618, 622, 559, 426/560, 625, 653, 661, 440, 446, 450, 496, 808; 241/8, 34, 68, 101.5

[56] References Cited

U.S. PATENT DOCUMENTS 3,404,986 10/1968 Wimmer .............................. 426/463
4,623,548 11/1986 Willard ................................ 426/559
4,623,550 11/1986 Willard ................................ 426/559
4,756,920 7/1988 Willard ................................ 426/549

*Primary Examiner*—Carolyn Paden
*Attorney, Agent, or Firm*—Hopkins French Crockett Springer & Hoopes

[57] ABSTRACT

Fried snack food products are produced by grinding cereal grain kernels such that all of the ground grain passes through a U.S. Number 20 screen, uniformly hydrating the ground grain into a grain/water slurry, cooking the grain/water slurry under conditions used to uniformly gelatinize the starch in said slurry such that a gel is formed thereby, cooling and reducing in size the gel such that dry ingredients may be added to the gel, forming the gel so that it may be cut into individual snack food pieces, and thereafter drying the pieces for long term storage or frying the pieces for immediate consumption. The process produces the snack food product which has more uniform texture, is less expensive to produce and does not have the characteristic limed flavor of conventional "Mexican-style" corn chips.

5 Claims, No Drawings

SNACK FOOD INGREDIENT AND METHOD FOR MAKING SAME

This is a continuation of application Ser. No. 883,519 filed 07/08/86 now U.S. Pat. No. 4,756,920.

BACKGROUND OF THE INVENTION

The invention relates to a process for making an ingredient useful in the production of snack foods. The ingredient is made from whole cereal grains which are ground prior to hydration and gelatinization of starch in the grain. The resulting product can be used as a snack food ingredient in a number of processes, as for instance a sheeted and fried corn chip product.

The present invention contemplates the use of one, or a combination of, starch-containing grains, such as corn, wheat, barley, oats, rye or rice as the basis of the snack food ingredient. Because of the large existing market for corn-based snack foods, the invention herein will be described primarily with reference to corn as the base material for the ingredient, but it should be recognized that the process works equally well for any mixture of the other named grains.

Conventional corn chips used as snack foods utilize a process wherein whole corn kernels are cooked and later soaked in hot lime water until the kernels have been completely penetrated by the hot alkaline solution and the kernel has become softened and the hulls partially digested. The lime treatment is required to soften and digest the hemi-cellulose content of the hulls and to alter the protein content of the kernel so that the hull can be removed by washing and the kernel readily disintegrated by stone grinding or other conventional grinding methods. This conventional process, still widely in us in the snack food industry, is wasteful from both a nutritional and process yield standpoint, in that the lime treatment extracts inter alia thiamine, riboflavin and niacin, and a significant portion of the total corn solids are lost in the water used to wash off the softened hull. While such products are acceptable to a great many people, a substantial portion of the population experiences an undesirable aftertaste resulting from the lime treatment. Countries of the western hemisphere are apparently the only ones in which this "Mexican" flavor is not objectionable; in most of Europe and the Far East such snacks have not gained acceptance because this flavor is perceived by most people as unpalatable.

Additionally, the corn ingredient or "masa" made by the conventional manufacturing process does not give a corn ingredient with uniform properties for snack processing. I have found that conventional corn processing leaves unsoftened portions of corn tissue in the center of the corn kernels. These portions have a lower moisture content, and therefore the starch is less gelatinized than in the outer more hydrated portions of the kernels. This random consistency within the corn kernel results in a ground cooked corn ingredient containing relatively large hard particles that cause a "gritty" mouthfeel in the finished snack product. While this "gritty" texture authentically recreates the traditional Mexican snack, it is objectionable to many people who prefer the smooth texture of, for instance, potato chips.

There have been a number of attempts to alter these and other deficiencies in the conventional process of corn chip manufacture. In U.S. Pat. No. 3,404,986, a process is disclosed whereby a portion of standard meal (a mixture of finely divided portions of corn germ and endosperm) and degerminated meal are blended at a moisture content of 16-35% and permitted an aging time of approximately one-half hour. A desired level of starch gelatinization is obtained by passing the hydrated mixture through the nip of rolls heated to 275°-500° F. These heated rolls serve not only to gelatinize the starch, but also to inactivate enzymes responsible for rancidity. Thereafter, the corn meal containing partially gelatinized starch is comminuted and used in the production of tortillas.

A long shelf life flour is produced by the process of U.S. Pat. No. 4,089,259, wherein whole grains are heated before comminution in order to deactivate enzymes which might cause rancidity. The process disclosed therein comprises adding surface water to kernels of grain which are fed into a roaster, which upon leaving the roaster are squeezed into flat flakes between heated (180° 14 300° F.) rollers. The heated rollers raise the temperature of the flakes to above 170° F., which are thereafter cooled and hammer milled into flour-sized particles.

Puffed fried food products, are made either directly in-process or from shelf stable pellets, by the process disclosed in U.S. Pat. No. 3,800,050. In this process, a dilute mixture of a high setback starch and water is mixed with one or more whole grains which may have been previously soaked in water and ground, or dry ground, and then heated to above the gelatinization point of the starch. The cooked, gelatinized mixture is then extruded as a thin layer of gel onto a cooling belt with air directed over the extrudate. A "skin" of gelatinized starch is said to develop on the surface of the extruded material which aids in the entrapment of steam within the product when it is subsequently fried. The thin layer of gel is then cut into rectangular shapes and dried to a stable moisture content of about 10% to form a pellet or "half-product". Subsequent frying of the pellets may take place immediately or the dried product may be stored for later use.

A manufactured or fabricated corn chip product of uniform shape is disclosed in U.S. Pat. No. 3,132,949, wherein a whole grain, such as corn is conventionally cooked in lime water and then stone ground until masa results. This masa is extruded in ropes and cut into individual pieces which are thereafter constrained between a pair of conveyors in an oven which flattens and partially precooks the pieces to a rubber-like consistency. These flattened pieces are somewhat less dense than cooking oil and therefore float. When subsequently immersed in hot cooking oil, these pieces float upwardly and contact a moving belt having caternary curves which form the pieces into the desired shape. Other patents of interest, but of less relevance, include U.S. Pat. Nos. 2,704,257, 3,545,979, and 3,708,308.

Therefore, it is an object of the present invention to provide a whole grain ingredient with no loss of fiber-containing solids which does not have the lime flavor of conventional chip products. Additionally, the process is intended to provide a snack food having a uniform texture upon eating, with this uniform texture being somewhat more tender than conventional snack food products.

Finally, the process is intended to provide a snack food free from relatively large non-uniformly ground and cooked particles readily perceived as "gritty" by those consuming the snacks.

SUMMARY OF THE INVENTION

The process of this invention produces a snack food product which is easily produced in a continuous manner from starch-containing cereal grains, without the undesirable aftertaste associated with like-soaking, and without the grittiness associated with products made according to prior art processes. Additionally, the process of the present invention utilizes 100% of the cereal grain, thereby producing a final product at substantially lower cost, due to the increased utilization of raw materials and lower waste-processing costs.

Conventional manufacture of fried grain-based chips (as will be described more fully hereinafter), is susceptible to being practiced with any one or more of number of cereal grains, however, for ease of explanation, the present invention will find particular application to a "corn chip". It is to be understood that the invention is not limited to the use of corn as the sole raw material base, but is equally susceptible for use with any one or more of a number of cereal grains. Prior art cereal processes do not utilize the kernel hull due to the difficulty of separating and/or grinding the hull apart from the rest of the kernel. Conventional removal of the hull by treatment with a hot calcium hydroxide solution results in a net loss of raw materials of approximately 15% of the raw material solids. The softened hulls washed from the kernels have a slimy gel-like consistency and cannot be recovered from the wash water for other use. Because of the difficulty in adequately disposing of such organic material, most municipalities charge relatively high rates for disposing of such materials.

Whole corn has become the chief cereal used for snack products because of its adaptability to the lime soaking process for hull removal. Other nutritious cereal grains such as wheat and oats are not processed in a similar manner because of the relatively small size of the kernels. The process of this invention makes possible the incorporation of such small grains in an efficient process for making a diversity of new hitherto unknown blends of various grains into novel snack products. For example, combinations of corn and wheat and oats can be combined to make a flavorful whole grain snack.

The present invention relates to the manufacture of an ingredient from whole cereal grains (e.g. corn), which when mixed with other dry ingredients form a dough capable of being formed into individual snack food pieces. The process of the present invention includes grinding the cereal grain uniformly, hydrating the ground grain with water at a temperature of from about 120° F. to about 160° F. to form a grain/water slurry (at a moisture content of from about 40% to about 70%), cooking the slurry to a temperature at least as high as the gelatinization temperature of the starch contained in the grain (about 165°14 170° F.) so that a significant portion of the starch present is at least partially gelatinized, cooling and reducing the size of the pieces of gelatinized grain (the "gel") so that it may be uniformly mixed with dry ingredients to form a dough and forming the dough into individual snack food pieces for subsequent drying or frying. For products formed by sheeting and cutting the dough into relatively thin pieces, "dockering" the formed dough, as set forth in my co-pending application Ser. No 826,233, may be practiced to prevent puffing during frying.

The rate of rehydration of any dry particle is related to the size of the particle, the water temperature and its availability. To effect uniform gelatinization of the starch within a dry particle of cereal grain it is necessary to first rehydrate the particle uniformly.

In the process of this invention the soaking time and temperature employed to rehydrate the grain particles before cooking is carefully controlled. These conditions are easily established according to the size of the comminuted grain particles and the absorptive characteristics of the grains being processed. Adequate rehydration of the largest grain particles assures uniform softening of the particles and gelatinization of the starch contained therein. During such rehydration processes enzymatic and bacterial reactions in the cereal slurry can be controlled by known means such as temperature, ph, or addition of suitable reaction inhibitors such as sulfur dioxide, or salts such as sodium bisulfite.

Preferably, the dough resulting from the process set forth above is sheeted between sheeting rolls and after dockering and cutting to shape, is fried conventionally. Alternatively, the dough may be extruded and fried, or the dough may be made into dried pellets for long term storage and subsequent frying.

DETAILED DESCRIPTION OF THE INVENTION

A new and delectable snack chip may be prepared from ingredients according to the new process disclosed herein. While various embodiments of this process will be set forth hereinafter, the process involves grinding a cereal grain to a particle size smaller than that which after hydration and gelatinization, are organileptically indistinguishable from one another in the finished product, uniformly hydrating the ground grain, and cooking the ground grain such that uniform gelatinization occurs in the starch component of the grain particles. In one embodiment, this cooked grain gel is dried and later ground to produce a gelatinized cereal ingredient. In my preferred embodiment, this cooked grain gel is cooled and reduced into convenient size for mixing with dry ingredients known to give desired snack food characteristics. The dough comprising the cereal gel and optional dry ingredients is then formed into convenient shapes by processes such as sheeting or extrusion, and fried for immediate use as a packaged snack food product. These various process steps will now be more fully explained in detail.

GRINDING

A unique feature of the invention is the initial grinding of the whole cereal grain kernel to a particle size small enough to remove any "grittiness" which may result from using particles large enough to be individually discernible when the finished product is eaten by a consumer. Grinding of the cereal grain may be by use of any appropriate hammer mill or impact mill or by any other apparatus which assures that the entire cereal grain will be ground to a particular minimum size, as by passing the ground material through a screen. For instance, an alternative grinding apparatus is manufactured by the Urschel Company under the tradename "Comitrol". Other suitable grinding apparatus include hammer mills such as those made by Pulverizing Machinery, Fitzmill Company, or the Rietz Manufacturing Company. In such apparatus, fixed or swinging blades are rotated at high speeds, subdivided the grains into particles small enough to pass through stationary screens of the desired size mounted within the unit.

The stone grinding apparatus traditionally used in the manufacture of conventional corn chips is not suitable for use in this invention because it is incapable of adequately grinding the hull of cereal grains, which is the reason for the lime-soaking step used in the manufacture of "Mexican-style" corn chips. Such stone and uniform grinding apparatus are not equipped with screens to assure adequate and uniform grinding has been accomplished. Finally, such rotary wheel grinding apparatus are designed for use with partially hydrated cereal grains (those which have been cooked and soaked to a moisture content of 40% to 70% moisture), not dry whole grains as used herein.

Applicant has found that it is necessary to assure that all of the ground cereal grain used in the process of the present invention will pass through at least a standard U.S. 20 mesh screen (having an opening of 0.033 inches, 0.84 mm). It is believed that grittiness of prior art products is caused by particles which, when rehydrated, would remain on a standard U.S. 20 mesh screen. However, removal of particles on U.S. 40 mesh screen (having openings of to 0.0165 inches, 0.42 mm) while more difficult, guarantees non-grittiness in snack products so produced, irrespective of cooking procedures. It is believed that an optimum distribution of particle sizes (as set forth hereinafter in the Examples) is necessary to obtain the optimum quality product of the present invention. For example, if the grain is ground so fine that all or most of the resulting flour passed through a standard U.S. 200 mesh screen the dough resulting from such flour would be extremely difficult, if not impossible, to cook and cool because of the release of substantial quantities of free ungelatinized starch.

It has been found that the size of the particles resulting from the grinding step is related to uniformity of subsequent hydration. Therefore, in a batch of ground grain having a particle size distribution as set forth in Example 3 below, the extremely small particles passing through the number 200 mesh screen are able to outcompete very large particles for water during hydration. Particles large enough to be retained on a number 20 screen cannot absorb enough water during a practicable period of hydration, so that they cannot be uniformly gelatinized during cooking and therefore result in the "gritty" mouthfeel associated with prior art products.

It is believed that if a substantial portion of the fine particles passing through the 100 to 200 mesh screen (0.0059 in. to 0.0029 in, 0.149 mm to 0.074 mm) are removed, the hydration and cooking of the remaining particles is more uniform. In this case, the extremely fine particles can be added in the dry state to the cooked cereal gel to form the dough from which the snacks are formed.

HYDRATION

The ground whole cereal grains must be uniformly hydrated in order to assure uniform gelatinization during cooking. Assuming constant particle size, hydration of ground cereal grains is believed to occur based upon a temperature/time relationship: the higher the temperature, generally the sorter the time required for hydration. It is possible that in the presence of enough water, hydration of finely ground cereal grains could occur in as short as a few minutes if accomplished in a steam-jacketed container with the injection of steam and/or very hot water. However, while not wishing to be held to any particular theory, applicant believes that it may be advantageous in some cases for the ground grain to hydrate somewhat more slowly during a "lay" or "holding" period, which would permit an equilibrium to be reached during the competition for water by relatively small and relatively large particles of ground grain. It is commonly known in the industry that relatively small particles of dried food solids hydrate substantially more quickly than larger particles; therefore in a relatively rapid high temperature/low time hydration sequence, the smaller particles may absorb a disproportionate quantity of the available water, resulting in nonuniform hydration and subsequent nonuniform gelatinization of starch.

Because of the temperature/time relationship of hydration, it is acceptable to hydrate the ground grain in cool or cold water; however, the time required for uniform hydration is unreasonably long and not susceptible to a continuous process at reasonable cost. Therefore, applicant has found that hydration of the ground grain with water at a temperature of from about 120° F. to about 160° F. for an average period of about 15 minutes to about 60 minutes results in relatively uniform hydration. As a general rule, it has been found acceptable to produce a slurry of grain and water with amounts of ground grain and warm water to produce a grain/water slurry having a moisture content of from about 40% to about 70%.

LAY TIME

Applicant has observed that in certain cases, for optimum hydration of the ground grain, it is preferable to permit the grain/water slurry to "rest" for a period of up to 60 minutes. Depending upon the temperature during hydration, this period may not be necessary to assure uniform hydration. However, at the temperatures believed preferable by applicant, optimum texture of the finished product may occur with a lay time as set forth herein. In cases where long holding times or "lay" times are desired, steps may be taken to avoid undesired enzymatic reactions in the slurry. For example, sufficient quantities of sulfur dioxide or salts such as sodium bisulfite can be added as processing aids to retard such reactions.

COOKING

After uniform hydration has been achieved, the grain/water slurry must be cooked such that the starches contained in the grain/water slurry are uniformly gelatinized. This 15 temperature must be above at least about 165°–170° F., the generally accepted temperature of cereal grain starch gelatinization. Cooking can occur in any suitable manner known to the art so long as some means of agitation is available to assure uniform heat distribution throughout the grain/water slurry to insure uniform gelatinization. For instance, an agitated steam jacketed kettle, a scraped surface heat exchanger or a steam injected "starch cooker" may be used.

Applicant has found that a particularly useful apparatus in the cooking of this slurry is the use of a swept-surface heat exchanger, such as those manufactured by the Crepaco Company or the Alfa-Laval Company. This apparatus is a cylinder through which the slurry is pumped by a positive displacement pump, the interior of the cylinder having "paddles" or "scrapers" which sweep the interior surface of the cylinder clean of adhered particles to assure relatively uniform mixing of and heat transfer to the slurry as it proceeds through the cylinder. The cylinder is normally provided with a steam jacket into which a heating medium such as steam is injected during cooking, with the outlet temperature of the cooked gel controlling the amount of heat required to result in the desired final gel temperature.

Applicant has found it advantageous to operate the swept surface heat exchanger at a temperature such that the grain/water mixture (now in the form of a "gel") with a moisture content of approximately 47% to 53% exits the heat exchanger at a temperature of from about 165° F. to about 220° F., optimally from 180° F. to 190° F. The pumping rate is adjusted to give a cooking time within the cylinder of from about 0.75 minutes to about 5 minutes. The internal blades are adjusted to rotate at from 30 to 350 rpm which is adequate to prevent baking or scorching of product adhered to the interior cylinder walls, while at the same time slow enough to avoid significant mechanical shear of the product being cooked. Holding tubes are commonly used to extend the time of heat treatment following heating to the desired temperature in the swept surface heat exchanger.

However, because of the relatively low moisture content of the cooked gels of this invention, the gels can increase rapidly in viscosity if even slight cooling takes place during the holding step. For this reason the use of conventional holding tubes can require excessively high pressure to move the gel through the tube.

Alternately, two scraped surface heat exchangers can be used in series to accomplish the extended holding with minimum danger of plugging the system.

DOUGH PREPARATION

The gel exiting the cooking vessel must be cooled so that it can be handled during dough preparation and subsequent forming. Rather than permit the gel to cool over a relatively long period of time at ambient temperatures, applicant has found that by mechanically cooling the gel, the starch can be rapidly "set back" to reduce its stickiness. For example, by forcing the gel between one or more pairs of cooled rolls, the gel can be reduced in temperature to between 60° F. and 75° F. The cooled gel is then optionally reduced in size, for instance by cutting in thin strips or by a Reitz hammer mill, to relatively small particle size, such as through a screen having ⅜ths inch openings. This cooling and reduction is useful to facilitate mixing the gel with dry ingredients useful in the manufacture of snack chips.

The dry ingredients, as for example those set forth in Example 2 below, are added both as processing aids and to control the texture of the finished product. For example, the potato flakes are deemed an optional ingredient and can be added to produce a more cohesive dough which is easier to sheet. The amioca and pregelatinized corn flour can be added for texture control; without them, the resulting chip tends to have less expansion and, therefore a harder texture. These ingredients permit a gradual expansion of the dough sheet upon frying, producing a more pleasant mouthfeel.

SNACK MANUFACTURE

Embodiment 1

Snacks can be prepared by the processes described in co-pending patent application Ser. No. 614,382. In this process the cereal ingredient is combined with a relatively high absorption cereal ingredient such as pregelatinized corn flour, in addition to an ungelatinized cereal starch such as amioca starch. Selection of the most appropriate high absorption cereal ingredient and the non-gelatinized starch can be made by the practice of the aforementioned patent application or by those familiar with the art. In addition, other ungelatinized cereal ingredients such as finely ground gelatinized cereal flours can be included to achieve variations in texture and flavor by those knowledgeable in the art.

For example, the ingredients may be sheeted between multiple or single reduction rollers to a dough thickness of between 0.65 and 1.0 mm, dockered by a flexible brush described n my copending application Ser. No. 826,233, cut into appropriate shapes and fried to produce a relatively thin snack product having a desirable texture, low bulk density and excellent cereal flavor.

Embodiment 2

The gelatinized cereal ingredient of this invention may be combined with relatively high water absorbing ingredients and ungelatinized cereal starches and be extruded in various shapes a described in copending application Ser. No. 614,381. These products are formed into convenient shape by means such as a hydraulically activated piston forcing the dough through a number of openings such as a round cylinder ⅜ inch in diameter with openings of about 0.045 inch and subdivided into rings with an average length of about 0.5 inch. The product is fried continuously at a temperature of 350° F. to produce a snack ring with crunchy texture and fat content of about 30%.

Embodiment 3

The gelatinized cereal ingredient of this invention is subjected to the maximum gelatinization conditions and moisture content provided by the means of this invention. For example, finely ground corn particles (substantially all passing through a U.S. 60 mesh screen (0.0098 in, 0.25 mm)) are rehydrated to a moisture content of about 70%, gelatinized in the swept surface heat exchanger to a temperature of about 190° F., formed into a narrow sheet, on the order of 1 mm thick, cooled to a temperature of about 60° F., cut into pieces, dried at a temperature of 150° F. maximum to a moisture content of about 12%. The dried pieces are stored for a period of time to equalize the moisture content within the pieces. Later, the products are fried in a continuous fryer at 380° F. for a period of 12 to 30 seconds to produce a greatly expanded product with desirable flavor and a light, airy texture.

Embodiment 4

The cooked whole grain gel provided by the previous embodiments is normally cooled and used immediately in various snack processes. In this embodiment the cooked gel is dried by standard means, reduced to a fine powder and stored for later use as a snack ingredient.

For example, the cooked gel is cooled to about 60° F. to 80° F., held for up to 60 minutes to reduce its stickiness, subdivided into pieces about 0.25" inches diameter and dried to under about 8% moisture. The drying is conducted at a temperature low enough not to alter the water absorption of the gel, preferably under 160° F. The dried pieces are then further reduced to a size convenient for use in snack formulations such as those described above. A convenient size ingredient for use in dry snack mixtures is one in which all particles pass through a U.S. 40 mesh screen (0.0165 in., 0.420 mm).

PRODUCTS

The products resulting from the processes set forth above are unique in that they do not have the characteristic limed flavor of conventional cereal grain chips, rather they have a "smooth-light" mouthfeel due to the uniform small particle size or conversely, and an absence of large particles of the ground grain. The products are less expensive to produce than conventional cereal grain snack chip products because of the higher yield (basically 100%) from the raw materials, lower equipment capital costs (no large soak tanks, grinding stones, etc.) and the fact that the process is continuous. The products have a more intense flavor of the raw materials due to the complete and uniform hydration of the flavor precursors in the raw material before heat treatment, and the presence in the finished product of 100% of the original solids of the starting raw material.

EXAMPLES

Example 1

PROCESS 1:

Dry yellow corn was used to produce a fried snack according to three different processes.

Yellow dent corn was cooked in two times its weight of water in a steam jacketed kettle for a period of 35 minutes following the point of first rolling boil. The corn was drained and soaked overnight (about 16 hours) in 90° F. water. It was drained and found to have a moisture content of 55%. The corn was then ground in a Model 1700 Urschel Comitrol with 0.02030 head. The corn was then used as the major ingredient in a number of snack processes. A 100 gm portion of the ground corn was soaked in water to separate the particles, and then screened through a U.S. No. 20 mesh screen with openings measuring 0.0331 inch (0.84 mm). The portion remaining on the screen weighted 16.8 gm, indicating a substantial amount of +20 particles capable of causing grittiness in finished snack products. It was found that this process was susceptible to uncontrolled fermentation during batch soaking at temperatures exceeding 140° F. Such fermentation created off flavors resembling cloves in the finished snack product.

The soaked corn kernels from one lot of corn were examined by cutting through the kernels transversely with a sharp knife. It was found that the degree of water penetration and subsequent gelatinization of the starch in the kernel varied considerably from kernel to kernel. The variation of gelatinization within the kernels could be explained by the size of th kernel and the location of the kernel in the soak tank, since there was a variation in temperature depending on the location within the tank.

A laboratory test was performed to determine the effect of cooking time on the internal appearance of corn kernels, which is indicative of the level of starch gelatinization. Cooking of the kernels in plain tap water was conducted for periods shown in the table below. Following cooking a random number of kernels from each sample was removed and sliced open to observe the gelatinized and ungelatinized areas. Using a magnified viewer with counting grid, it was possible to measure approximately the area of "cooked" (and therefore gelatinized) and "uncooked" (and therefore ungelatinized) areas within the kernels. The results are shown in the table below.

| Cook time, minutes | 30 | 60 | 90 | 120 | 150 | 180 |
|---|---|---|---|---|---|---|
| Area gelatinized* | 5 | 6.5 | 9 | 9 | 9 | 10 |
| Area ungelatinized* | 5.5 | 4.5 | 3 | 1.5 | 1 | 1 |
| Total area* | 10.5 | 11.0 | 12 | 10.5 | 10 | 11 |
| Percent gelatinized | 48 | 59 | 75 | 86 | 90 | 91 |
| Percent ungelatinized | 52 | 41 | 25 | 14 | 10 | 9 |

*Units of measure are 1/100 square inch.

It was noted that even with a cooking time in boiling water as long as 3 hours, some portions of non-gelatinized starch remained in the kernel. It was then concluded that the nonuniformity of starch gelatinization of this process played a major part in establishing the poor eating quality of the finished fried snack product. In particular, all snacks made from corn from this process gave a chewy consistency and starchy powdery mouth sensation during consumption of the snacks, and had a gritty mouthfeel.

PROCESS 2:

Whole corn kernels were ground in a Reitz hammer mill at speed setting no. 6 through a ⅜" square opening. Under these conditions, all of the kernels were broken into a number of smaller pieces, approximately ⅛" diameter. 11.3 lbs. ground corn was soaked for about 20 hours in 9 lbs. cold tap water. A quantity of sodium bisulfite was added to the water to prevent bacterial growth. After soaking it was found that the corn had increased to a final moisture content of about 52% moisture. The soaked corn was then ground through an Urschel Comitrol using the 1030 head. The moisture of the ground corn was adjusted to 55%, after which it was then placed in foil lined steamer trays about ¼" deep, covered and steamed for 10 minutes at 204° F. The corn gel was removed from the cooker and allowed to steam until it reduced in temperature to about 160° F. The gel was then further cooled and examined for possible use in snack production. While there was a decided reduction in the apparent grittiness of the corn gel, it was concluded that the process was inoperable because of the long soaking time required to hydrate the ground corn with cold water. It was then concluded that if corn was first reduced to the particle size desired in the finished snack while the corn was still in its dry condition, the long soak period could be avoided. p PROCESS 3:

A quantity of dry yellow dent corn having a moisture content of about 9.6% was ground through a Reitz hammer mill fitted with a 0.032 Conidore screen. The screen analysis of the ground corn was as follows:

| | |
|---|---|
| +40 | 15.2% |
| +80 | 37.8% |
| +100 | 2.7% |
| −100 | 40.6% |

2.5 lbs of the ground corn was mixed with 2.5 lbs of water at 80° F. to give a slurry with a moisture content of 55.5%. The slurry was poured into metal trays approximately 12"×24" to a level of about 0.25 inches. The trays were then placed in a steam cabinet and subjected to atmospheric steam for a period of about 30 minutes to give a uniformly gelatinized corn gel. After the trays were removed from the steam cooker, the gel cooled rapidly by evaporation to a temperature of about 150° F. By this time the sheets of corn gel stiffened and could be handled because of the rapid setback of the corn starch contained in the gel. The gel was fed between two oppositely rotating cooling rolls through which water at about 35° F. was circulated. The gel was quickly reduced in temperature to about 60° F. The cooled gel was then shredded through a ⅜" screen in a Rietz hammer mill to produce a friable non-sticky corn ingredient.

An extruded corn snack was made from the cooled comminuted corn gel by combining the following ingredients in a household food processor fitted with sharp blades.

|  | gm | Formula Percent (c) |
| --- | --- | --- |
| Shredded corn gel | 311.4 | 49.1 |
| Amioca | 46.8 | 15.0 |
| Pregelatinized corn flour (a) | 15.6 | 5.0 |
| Pregelatinized rice flour (b) | 46.8 | 15.0 |
| Corn Starch | 32.3 | 10.35 |
| Soy oil | 16.8 | 5.4 |
| Durem GMO emulsifier | 0.46 | 0.15 |
| Water | 129.8 | |

(a) Illinois Cereal Mills product 961
(b) Riviana Foods Rice Gel 100
(c) Expressed on a 10% moisture basis The dry ingredients were blended in the food processor for 5 minutes until thoroughly blended. The shredded corn gel was added and mixed until uniform dispersion was achieved. Water was then added and mixed until thoroughly blended.

The dough was extruded through a Pastamatic pasta extruder fitted with a die with two closely situated holes measuring 0.150" diameter. As the two strands of dough emerged, they were twisted and cut into pieces at 2.5" lengths. The dough pieces were fried at 350° F. in a batch fryer to finished moisture content of 1.6%. The finished product contained 31% fat. The product quality was judged superior to the same product made by Process 1 in that the corn had a richer fuller flavor and the objectionable grittiness sensation had disappeared. In addition, Process 3 recovered substantially 100% of the corn solids used in making the gelled corn ingredient.

EXAMPLE 2

A semi-continuous pilot plant was installed to cook ground whole cereal products, particularly corn, for the production of fried corn snacks.

For this series of tests the corn preparation was as described in Process 3 of Example 1 except that various screen sizes were tested as described below. The corn/water slurry was cooked by using a Blaw-Knox experimental drum drier with two steam heated rolls 6" in diameter, 8" long. The corn/water slurry was made with water at temperatures varying from room temperature to 200° F. (typically at 140° F.) and placed in the nip of the steam rollers, which were operated to give a residence time of the gel on the heated surface of the roll from about 6 seconds to about 12 seconds. The opening between the rollers was adjusted so that a layer of cooked corn about 1 mm thick adhered to the roll surface. As the layer of cooked corn contacted the doctor blade, the gel rolled and formed a cylinder that gradually increased in size to approximately 1.5" in diameter, after which it fell into a metal receptacle below the drier discharge point. Typically, the temperature of the gel as collected was about 190° F. to 200° F., indicating that the starch contained in the gel had exceeded the gelatinization temperature.

As a result of exposure to heat on the drum surface, a thin film of partially dried corn adhered to the drum surface beneath the layer of heated gel, but as the corn gel wrapped itself into a tight cylinder, the dehydrated layer quickly rehydrated by contact with the hot gel.

The cylinders of gelled corn were cooled by passing them through two water cooled rollers as described in Process 3 of Example 1 using water ranging from 35° F. to 55° F. The cooled gel was then ground through a ⅜" screen in a Reitz hammer mill to produce a friable non-sticky corn ingredient.

A series of fried corn snacks were made from the cooled comminuted corn gel by combining the following ingredients in a 40-liter Stephan mixer fitted with sharp blades:

|  | gm | Formula Percent (b) |
| --- | --- | --- |
| Ground Corn gel | 9447.7 | 71.0 |
| Amioca Starch | 780.9 | 11.7 |
| Pregelatinized corn flour (a) | 780.9 | 11.7 |
| Salt | 40.7 | 0.60 |
| Water | (d) | |
| Potato flakes (c) | 333.89 | 5.0 |

(a) Illinois Cereal Mills product 961
(b) Expressed on a 10% moisture basis
(c) Low leach, low peel flakes as normally used in making fabricated potato snacks
(d) When required The corn gel and premixed dry ingredients were placed in the Stephan mixer and blended for 15 seconds, at which point the water was added and mixing continued for an additionally 45 seconds, or 60 seconds total mixing time. The friable, crumbly corn dough was sheeted between three pairs of stainless rollers operated to give reductions to 2.03 mm, 1.33 mm and 0.83 mm in series; cut into triangles with sides approximately 2" long; dockered with a flexible nylon brush designed to give a point density of about 120 holes per square inch as described in my copending patent application Ser. No. 826,233. The cut pieces were then fried continuously at a temperature of 375° F. for a period of about 45 seconds. The finished product had a pleasing corn taste and crisp tender texture.

In a separate test the effect of particle size of the ground corn was measured by grinding it through the Reitz hammer mill fitted with a (a) 0.040 K screen; (b) 0.032 K screen; (c) 0.023 K. screen; (d) 0.016 K screen. The screen analysis of the dried corn particles was as follows:

| Screen Mesh Size | (% Retained on Various Screen Sizes) In Four Samples | | | |
| --- | --- | --- | --- | --- |
|  | A | B | C | D |
| +20 | 2.3 | 0 | 0 | 0 |
| +40 | 42.1 | 32.8 | 18.4 | 0.3 |
| +60 | 16.6 | 20.8 | 25.0 | 21.0 |
| +80 | 6.3 | 7.1 | 9.8 | 15.4 |
| +100 | 2.0 | 3.3 | 3.9 | 5.6 |
| +200 | 7.0 | 8.6 | 9.3 | 12.6 |
| −200 | 23.7 | 27.4 | 33.6 | 45.1 |

The particles were hydrated with water at 160° F. and processed into snacks as previously described. The hydrated slurry of Sample A was very soupy and not very sticky; Sample B was less soupy and more sticky; Sample C was very thick and very sticky; Sample D was extremely thick and sticky, indicating that some of the starch particles had partially gelatinized when they were contacted at the water at 160° F.

The product made with an ingredient of Sample A was extremely grainy, although it had a light texture and a bubble index of 1. (Bubble index is an arbitrary measurement of the degree of puffing of the finished fried snack in which a level of about 20 is acceptable and 100 is a totally puffed product.

Products made from ingredients of Samples B and C had excellent light texture and no grittiness with a bubble index of 12 and 30 respectively. Products made with Sample D wa badly puffed with an index of 51. It was concluded that a finer particle size such as used in C or D could be utilized in snack manufacture if those portions passing through 100 or 200 mesh could be eliminated from the slurry.

Example 3

A slurry of ground cereal ingredients, chiefly yellow corn, was processed in a continuous pilot plant to give a gelatinized, cooled, comminuted corn ingredient for making various snack products as described below:

Dry yellow dent corn was ground through an Urschel Comitrol grinder fitted with a cutting head model 3B-010020. The typical screen size of ground corn prepared in this manner is shown below:

| Screen Size | Percent |
| --- | --- |
| On US 40 | 26 |
| On US 60 | 28 |
| On US 80 | 12 |
| On US 100 | 3 |
| On US 200 | 9 |
| Thru US 200 | 22 |

A slurry of cereal solids and water having a moisture content ranging from about 50% to 60% was prepared in water at a temperature from 60° F. to 160° F. The raw corn slurry was pumped from a reservoir using a Crepaco R2R Gear Pump through a Crepaco model HPL-1 swept surface heat exchanger in which the slurry was heated by an external jacket containing steam at 60 psi. Typical conditions of processing were as follows:

Rate of feed of slurry, 1.5 lb/minute to 3 lb/minute
Rate of speed of internal scraper blades, 83 rpm
Steam pressure, 15 psi to 60 psi
Temperature of slurry at inlet, 60° F. to 130° F.
Exit gel temperature, 195° F. to 205° F.
Retention time in heat exchanger, 3 minutes to 10.5 minutes
Retention time in exit pipe, 1.5 minutes
Total exposure time in heat exchanger and holding time of cooked gel 3 minutes to 12.0.

The 2.0 inch diameter exit pipe was connected to a V-shaped distribution nozzle with an opening of 0.5 inches by 6 inches. The hot corn gel emerging from the nozzle at about 200° F. was distributed on a slowly moving, open mesh, stainless wire belt. When conveyed a distance of four feet in a period of 4.5 minutes, surface evaporation reduced the temperature to between 140° F. and 160° F. depending on ambient temperature and air movement. Because of the rapid setback of the corn starch, there was no sticking to the wire mesh belt. The stiffened corn gel was then passed between the rolls of the double drum unit described in Example 2. Water circulating at 55° F. in the rolls further reduced the gel temperature to between 100° F. and 110° F. This gel was then further cooled by being sheeted through a second set of cooling rolls set to give a gel thickness of about 1.0 mm. After a residence time of 15 seconds on the second cooling rolls, the gel was at a temperature of between 60° F. and 65° F. The gel was then further retrograded during conveying on a slowly moving mesh conveyor for a period between 1 and 20 minutes. It was noted that after a period of about 15 minutes the characteristic sticky cohesive nature of the corn gel changed into a friable, easily disintegrated mass. After this period of holding, the cooled gel (at about 65° F. to 70° F.) was fed into the Reitz hammer mill and easily ground through the ⅜" square opening to form a crumbled particulate corn ingredient for use in further snack processing, as set forth in Example 2.

Example 4

A slurry of ground yellow corn similar to that described in Example 3 was made from 1:1 mixture of ground corn and water at 160° F. The corn slurry, which after mixing had a temperature of 123° F, was allowed to stand for 45 minutes before further processing to allow time for complete hydration of the larger particles, particularly those retained on the U.S. 40 mesh screen. The viscosity of the resultant mixture after 45 minutes was about 40,000 centipoise, as measured on the Brookfield Viscometer. This slurry was pumped through the Crepaco swept surface heat exchanger at a rate of 3.8 lb/minute, giving a residence time in the exchanger body of 3.0 minutes.

The cooked gel emerging from the exchanger at about 204° F. and was collected in 5 gallon covered plastic buckets and allowed to stand 15 minutes before mechanical cooling. Earlier tests had indicated that a holding period at 180° F. or above after starch gelatinization would enhance the flavor of the finished product. The gel at 180° F. average was cooled once through a set of 12" diameter sheeting rolls through which water at 35° F. was circulated. The gel at 70° F. was ground through the Rietz hammer mill without screen and used without delay in processing sheeted snacks according to the formula shown in Example 2, as follows:

The corn gel and premixed dry ingredients were placed in the VCM mixer and blended for 15 seconds, after which water was added and mixing continued for only 30 seconds. The crumbly corn dough was sheeted between a single pair of stainless rollers operated to give a dough thickness of 0.85 mm to 0.88 mm, cut into 2" diameter round circles, dockered with a flexible nylon brush, fried continuously at a temperature of 375° F. for about 45 seconds as described in Example 2. The finished product had a more full rich corn flavor than the products of Examples 2 and 3 and in addition had no perceivable grittiness of mouth feel. The average fat content was from 30% to 31% and had a pleasing light texture and total absence of starchy aftertaste.

Example 5

The procedure of Example 4 was used in a number of trials in which the use of the gelatinized cereal ingredient was studied.

5A. The level of ground corn gel was increased to 80% of the total snack ingredients, with corresponding reductions in the other dry ingredients. The product had more corn flavor, but the dough was more sticky.

5B. Equal amounts of raw (uncooked) finely ground corn flour and whole ground corn were mixed with water and cooked to a gel. The pregelatinized corn flour was omitted from the formula. The snacks made from this gel were similar to the products of Example 4.

5C. A portion of the cooked corn gel was replaced with uncooked slurry equivalent to 22% of the total solids of the snack ingredient. The fried snack made from this gel was noticeably grainier than Example 4 product.

5D. The pregelatinized corn flour in the dry mix of Example 4 was replaced with the same amount of the ground whole corn from which the cooked gel was made. The formula for this sheeted snack product, expressed on a 10% moisture content basis, was as follows:

| | |
|---|---|
| Amioca starch | 15.0% |
| Salt | 0.6% |
| Ground whole corn | 9.4% |
| Cooked corn gel | 75.0% |

The fried product was crisp and had stronger corn flavor than all other samples in this series. However, the product was gritty, as was the product of 5C. It was concluded that alternate approaches for using the finely ground cereal ingredient directly in the snack formulation include:

(1) Any portion of the dry cereal ingredient to be included in the snack formulation without cooking should be finely ground, for example to pass entirely through a 40 or 50 mesh sieve.

(2) When grinding the cereal grain, a separation should be made of finer particles by conventional means (screening or other size classification processes). For example, those fractions passing through 100 mesh (0.0059 in.) or 200 mesh (0.029 in.) should be separated from the major portion of the comminuted cereal grain ingredients. These smaller fractions can be combined with the optional dry snack ingredients and later included in the mixture with the hydrated, cooked larger particles of comminuted cereal grains in the snack dough formulation.

By this means the hydration and cooking of the relatively larger ground cereal particles is enhanced and a more uniformly hydrated and cooked gel is produced. While not wishing to be bound by the following interpretation, I believe that the advantage of this process is that the smaller ($-100$ mesh) fractions, consisting mainly of released raw starch, when gelatinized (subjected to temperatures over about 165° F. in the presence of sufficient water) exhibit such a preferential absorption of the available water in the system that the larger cereal particles in the slurry are correspondingly deprived of water. As a result, the degree of hydration (gelatinization) of the starch molecules contained in the larger particles could be substantially reduced.

Thus, by delaying the gelatinization of the most finely ground cereal ingredients until the heating of the snack dough pieces during frying, improved control of the texture and structure of the fried snack can be achieved.

I claim:

1. A continuous process for producing a fried snack food, comprising the steps of:
    a. grinding dry cereal grain kernels such that a major portion of the ground cereal grain passes through a U.S. No. 20 mesh screen and is retained upon a U.S. No. 100 mesh screen;
    b. uniformly hydrating the ground cereal grain with water to form a grain/water slurry having a moisture content of from about 40% to about 70% water;
    c. uniformly gelatinizing substantially all of the starch in the grain/water slurry by cooking the grain/water slurry at a temperature above the gelatinization temperature of starch to form a gel;
    d. cooling the gel such that a major portion of the gelatinized starch therein is set back;
    e. mixing the cooled gelatinized ground grain with dry snack food ingredients to form a dough;
    f. forming the dough into individual snack food pieces; and
    g. frying the individual snack food pieces;

2. A continuous process for producing an ingredient which, when mixed with other snack food ingredients, is useful in the production of snack foods, comprising the steps of:
    a. grinding dry grain kernels such that the particle size of the ground grain is reduced to a size such that all of said grain passes through a standard U.S. No. 20
    b. uniformly hydrating the ground grain into a grain/water slurry having a moisture content of from about 40% to about 70%;
    c. cooking the grain/water slurry such that the starch in said grain/water slurry is uniformly gelatinized and a gel is formed;
    d. cooling the gel such that a major portion of the starch therein is set back; and
    e. utilizing the cooled gel as an ingredient in the subsequent manufacture of snack foods.

3. A continuous process for producing a snack food ingredient comprising the steps of:
    a. grinding dry cereal grain kernels such that a major portion of the ground cereal grain passes through a U.S. No. 20 mesh screen and is retained upon a U.S. No. 100 mesh screen;
    b. uniformly hydrating the ground cereal grain with water to form a grain/water slurry having a moisture content of from about 40% to about 70% water;
    c. uniformly gelatinizing substantially all of the starch in the grain/water slurry by cooking the grain/water slurry at a temperature above the gelatinization temperature of starch to form a gel;
    d. cooling the gel such that a major portion of the gelatinized starch therein is set back;
    e. drying the cooled gel to a moisture content less than about 8% water;
    f. grinding the dried gel to a size convenient for use in a snack food, and storing the ground dried gel for later use as a snack food ingredient.

4. The process as set forth in claim 3, further comprising mixing the ground dried gel with dry snack food ingredients to form a dough.

5. The process as set forth in claim 4, further comprising forming the dough into individual snack food pieces and frying the individual snack food pieces.

* * * * *